United States Patent

[11] 3,561,646

| [72] | Inventor | James L. Meharry<br>R.R. 1, Wingate, Ind. 47994 |
|---|---|---|
| [21] | Appl. No. | 769,167 |
| [22] | Filed | Oct. 21, 1968 |
| [45] | Patented | Feb. 9, 1971 |

[54] MOVABLE BED FOR GRAVITY BED VEHICLES
2 Claims, 7 Drawing Figs.

[52] U.S. Cl. .................................................. 222/176,
222/371
[51] Int. Cl. ........................................................ A01c 15/18
[50] Field of Search ........................................... 222/178,
334, 371, 561, 176; 198/57; 214/83.18, 83.36

[56] References Cited
UNITED STATES PATENTS

| 1,752,549 | 4/1930 | Beardsley et al. | 198/57UX |
| 1,869,581 | 8/1932 | Paradise et al. | 214/83.18UX |
| 2,784,880 | 3/1957 | Pio | 222/371X |
| 2,827,204 | 3/1958 | McCurdy | 222/561X |
| 2,946,488 | 7/1960 | Kraft | 222/334X |
| 3,085,807 | 4/1963 | Tyler | 214/83.18X |

*Primary Examiner*—Robert B. Reeves
*Assistant Examiner*—Norman L. Stack, Jr.
*Attorney*—Woodard, Weikart, Emhardt and Naughton

ABSTRACT: A gravity bed vehicle having front and rear sloping bed surfaces which lead into an endless chain conveyor arranged to discharge from either transverse side of the vehicle.

PATENTED FEB 9 1971

INVENTOR.
JAMES L. MEHARRY
BY
Woodard, Weikart, Emhardt &
Naughton
ATTORNEYS

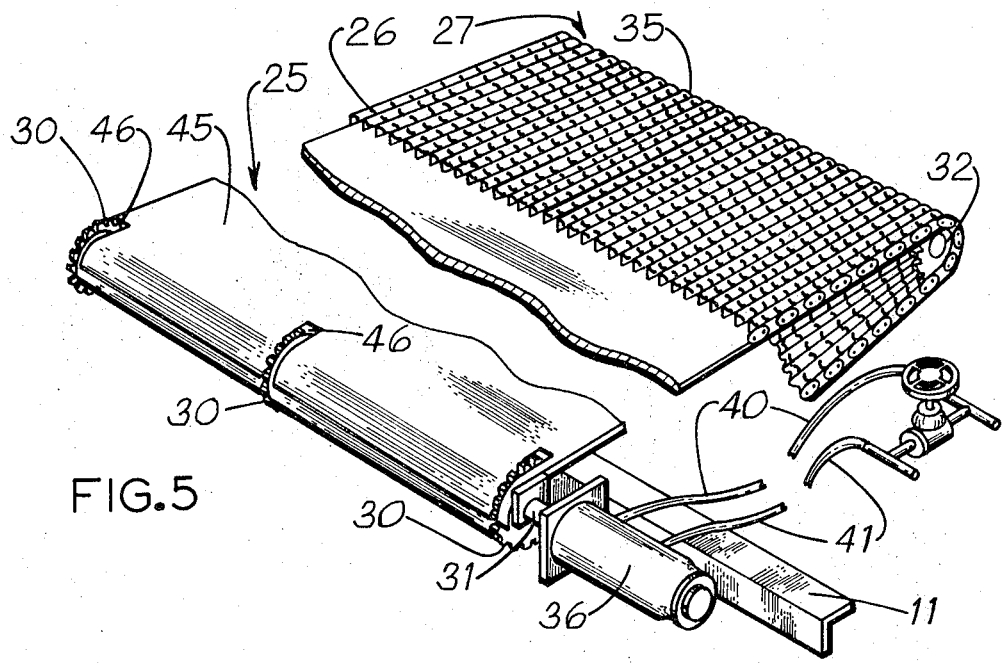
FIG.5
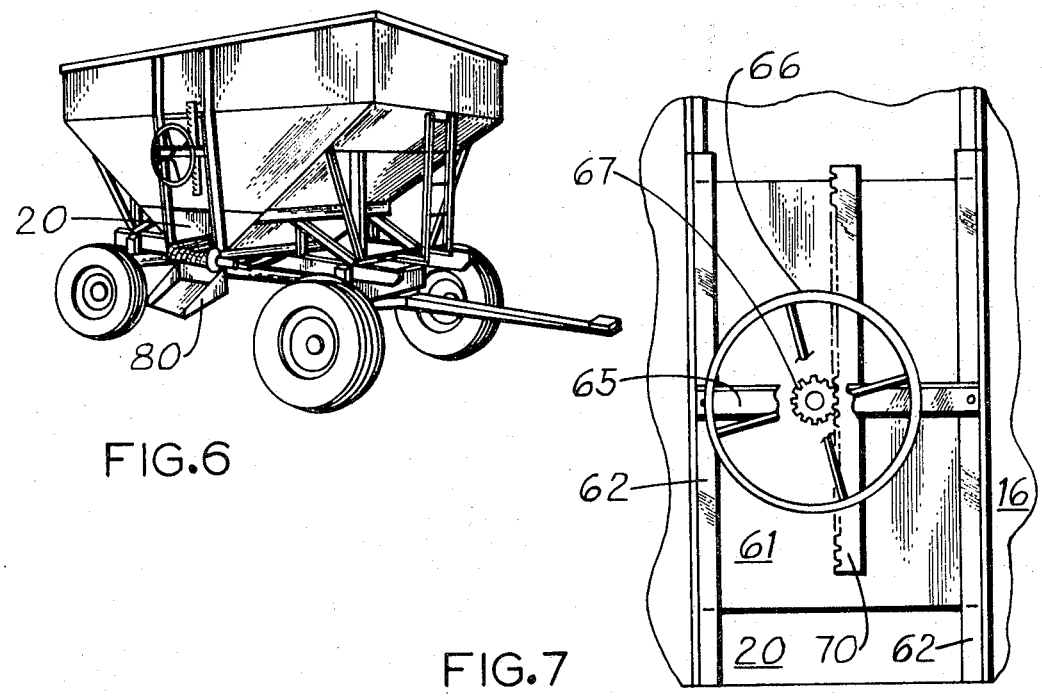
FIG.6
FIG.7
INVENTOR.
JAMES L. MEHARRY
BY Woodard, Weikart, Emhardt & Naughton
ATTORNEYS

3,561,646

MOVABLE BED FOR GRAVITY BED VEHICLES

BACKGROUND OF THE INVENTION

1. Field of the Invention

This invention relates to gravity bed vehicles.

2. Description of the Prior Art

Gravity bed vehicles are useful on the farm for moving granular fertilizer grain and the like from place to place. By reason of their sloping lower surfaces or bed, gravity bed vehicles are easily discharged or unloaded by the grain or the like moving across the sloping surfaces. Certain types of materials as well as grain when wet tend to stick together and are difficult to move out of such gravity bed vehicles. Consequently, there is a need for improved means for unloading gravity bed vehicles.

SUMMARY OF THE INVENTION

One embodiment of the present invention might include a gravity bed vehicle comprising a frame, said gravity bed vehicle having a front and a rear and a pair of transverse sides, four sidewalls mounted on said frame, a first two of said sidewalls extending substantially vertically but sloping downwardly and inwardly, said two sidewalls being located at the respective transverse sides, the other two of said sidewalls sloping downwardly and inwardly from said front and rear respectively, an endless conveyor mounted on said frame and having a horizontal upper surface which extends from one of said pair of transverse sides to the other and from the lower end of one of said other two sidewalls to the lower end of the other of said other two sidewalls, said conveyor including an endless chain belt, a pair of sprocket shafts rotatably mounted on said frame and extending from front to rear on said vehicle, sprockets secured to said shafts and meshing with said chain belt for the driving thereof, a hydraulic motor fixed to said frame and having its drive shaft coupled to one of said sprocket shafts for the driving thereof, said hydraulic motor being reversible, an imperforate floor fixed to said frame and positioned below said horizontal upper surface of said endless chain, said floor having slots therein through which said sprockets project.

One object of this invention is to provide an improved gravity bed vehicle.

Another object of this invention is to provide a gravity bed vehicle which is more quickly and more effectively unloaded than existing gravity bed vehicles.

Related objects and advantages will become apparent as the description proceeds.

BRIEF DESCRIPTION OF THE DRAWINGS

FIG. 5 is a perspective view of the structure illustrated in FIGS. 3 and 4 with portions broken away to show internal construction and also showing associated portions of the gravity bed vehicle.

FIG. 6 is a perspective view of an alternative embodiment of the present invention.

FIG. 7 is an enlarged elevation of a portion of the structure illustrated in FIG. 1.

DESCRIPTION OF THE PREFERRED EMBODIMENT

Figure 1:
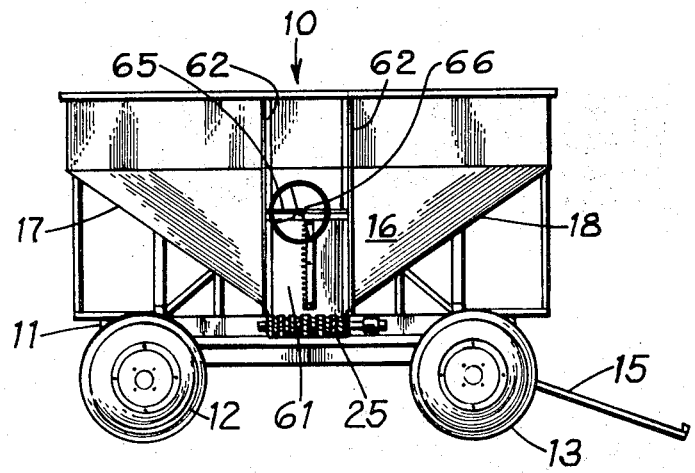
FIG. 1 is a side elevation of a gravity bed vehicle embodying the present invention.
Figure 2:
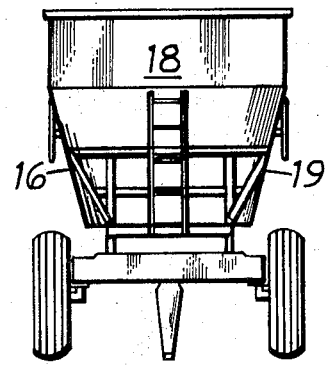
FIG. 2 is an end elevation of the gravity bed vehicle of FIG. 1.
Figure 3:
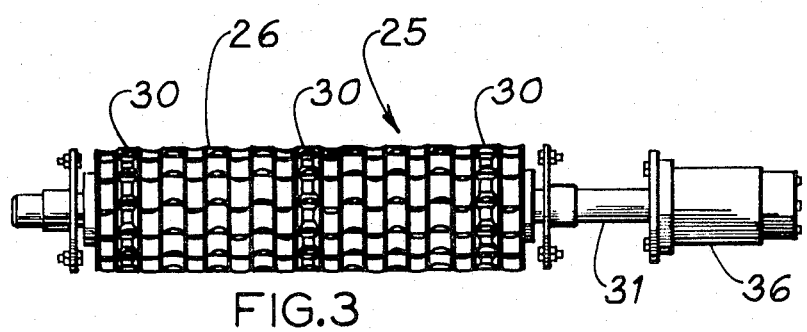
FIG. 3 is a detail and elevation of the conveyor of the present invention.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alternations and further modifications in the illustrated device, and such further applications of the principles of the invention as illustrated therein being contemplated as would normally occur to one skilled in the art to which the invention relates.

Referring now more particularly to the drawings, there is illustrated a gravity bed vehicle 10 which includes a frame 11 having four wheels 12 and 13 mounted thereon for supporting the vehicle and for moving it from place to place. The front wheels 13 are mounted on the gravity bed vehicle in such a way as to be capable of being steered by a tongue 15 which is connected to a prime mover for movement of the gravity bed vehicle. The gravity bed vehicle also includes four sidewalls 16, 17, 18 and 19. Two of the sidewalls, the front sidewall 18 and the rear sidewall 17, slope at approximately a 45° angle to the vertical and function to move the grain or the like inwardly toward the center of the vehicle. The other two sidewalls 16 and 19 are generally vertical but do slope somewhat inwardly and downwardly toward the center of the vehicle.

Each of the sidewalls 16 and 19 has an opening 20 therein positioned over an endless conveyor 25. The endless conveyor 25 has a horizontal upper surface 26 which extends from one of the transverse sides to the other of the transverse sides of the gravity bed vehicle. The upper horizontal surface 26 of the conveyor also extends from the lower end of one of the sloping sidewalls 17 to the lower end of the other sloping sidewall 18. The endless conveyor 25 includes an endless chain belt 27 which extends around, meshes with and is mounted on a plurality of sprockets 30 fixed to a sprocket shaft 31. The chain belt 27 also extends around sprockets 32 fixed to a sprocket shaft 35. Each of the sprocket shafts 31 and 35 is rotatably mounted upon the frame 11.

Figure 4:
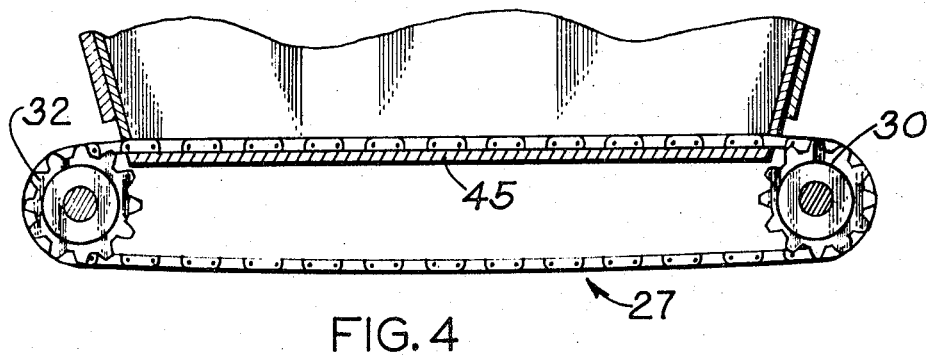
FIG. 4 is a detail rear elevation of the structure illustrated in FIG. 3 showing also associated portions of the gravity bed vehicle.

The sprocket shaft 31 is driven by a hydraulic rotary motor 36 which might be, for example, Model No. 208, manufactured by Char-Lynn of Minneapolis, Minnesota. The driving fluid is supplied to the motor 36 by hydraulic lines 40 and 41. Referring to FIGS. 4 and 5, it will also be noted that fixed to the frame 11 is an imperforate metal member 45 which is slotted at 46 to permit the sprockets 30 to mount and engage the endless chain belt 27. The metal member 45 acts as a bottom for the gravity bed vehicle and prevents the grain and the like from dropping through the endless chain belt 27 to the ground.

As mentioned above, each of the sidewalls 16 and 19 has an opening 20 therein through which the grain is moved out of the gravity bed vehicle. Each of the openings 20 is controlled by a door 61 which is moved up and down in tracks 62. Fixed to the tracks 62 is a cross bar 65 upon which is rotatably mounted a wheel 66 having a pinion 67 fixed thereto and engaging a rack 70 fixed to the door. The doors 61 can be raised and lowered by rotation of the wheels 66 to operate the pinions on the racks 70.

Referring to FIG. 6, there is illustrated an alternative embodiment of the present invention which is generally identical to the above described embodiment but with the exception that it has incorporated thereon and added thereto a pair of chutes 80 on each side of the gravity bed vehicle. The chutes 80 are fixed to the frame 11 in a position to extend outwardly and downwardly from a point underneath of the metal plate 45 so as to receive and guide grain outwardly away from the conveyor when the grain drops off of the conveyor.

It will be evident from the above description that the present invention provides an improved gravity bed vehicle. Thus the gravity bed vehicle of the present invention is more quickly unloaded and more effectively unloaded than existing gravity bed vehicles. In one specific embodiment of the present invention unloading can be accomplished of 170 bushels of grain in approximately 40 seconds. It can also be appreciated that by reason of the reversible nature of the hydraulic motor 36 unloading can be accomplished from either side or through either of the openings 20 of the gravity bed vehicle.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

I claim:

1. A gravity bed vehicle for handling grain comprising a frame, said gravity bed vehicle having a front and a rear and a pair of transverse sides, four sidewalls mounted on said frame, a first two of said sidewalls extending substantially vertically but sloping downwardly and inwardly, said two sidewalls being located at the respective transverse sides, the other two of said sidewalls sloping downwardly and inwardly from said front and rear respectively, an endless conveyor mounted on said frame and having a horizontal upper surface which extends from one of said pair of transverse sides to the other and from the lower end of one of said other two sidewalls to the lower end of the other of said other two sidewalls, said conveyor including an endless chain belt, a pair of sprocket shafts rotatably mounted on said frame and extending from front to rear on said vehicle, sprockets secured to said shafts and meshing with said chain belt for the driving thereof, a hydraulic motor fixed to said frame and having its drive shaft coupled to one of said sprocket shafts for the driving thereof, said hydraulic motor being reversible and capable of driving one of said sprocket shafts when said vehicle is fixed with respect to the ground, an imperforate floor fixed to said frame and positioned below said horizontal upper surface of said endless chain, said floor extending completely under said horizontal upper surface of said endless chain, said floor extending around said shafts and having slots therein through which said sprockets project, a first pair of wheels rotatably mounted to said front, a second pair of wheels rotatably mounted to said rear, a tongue connected to said first pair of wheels for steering said vehicle.

2. The gravity bed vehicle of claim 1 additionally comprising a pair of doors, said first two sidewalls each having a door opening therein which is positioned above said conveyor, said first two sidewalls each having a pair of generally vertically extending tracks thereon, said doors being independently operable and received in said tracks for vertical movement therein, a pair of racks each mounted on a respective door, a pair of wheels each rotatably mounted on a respective one of said first two sidewalls, said wheels each having a pinion thereon which engages a respective one of said racks for raising and lowering said doors, said doors each being positionable to close off a respective one of said door openings.